United States Patent [19]

Zimmerman

[11] 4,009,741
[45] Mar. 1, 1977

[54] WOODWORKING MACHINE

[75] Inventor: Edwin H. Zimmerman, New Holland, Pa.

[73] Assignee: E.Z. Mfg. Co., New Holland, Pa.

[22] Filed: Mar. 23, 1976

[21] Appl. No.: 669,687

[52] U.S. Cl. .................................. 144/41; 83/404; 83/51; 144/249 R; 144/37; 144/39
[51] Int. Cl.² .......................................... B27C 9/04
[58] Field of Search ............ 144/37, 39, 41, 249 R, 144/249 A; 83/404, 407, 51

[56] References Cited

UNITED STATES PATENTS

| | | | |
|---|---|---|---|
| 199,364 | 1/1878 | Hall | 144/41 |
| 987,012 | 3/1911 | Perkins | 144/39 |
| 1,769,927 | 7/1930 | Langill et al. | 144/249 A |
| 1,986,770 | 1/1935 | Farley et al. | 144/41 |
| 3,724,519 | 4/1973 | Edwards et al. | 144/116 |
| 3,870,090 | 3/1975 | Hasfjord | 144/249 R |

Primary Examiner—Donald R. Schran
Attorney, Agent, or Firm—C. Hercus Just; John C. Thompson

[57] ABSTRACT

A woodworking machine capable of simultaneously making a number of cuts through stock material and shaping opposed edges simultaneously to form a plurality of pieces finished on all sides. The woodworking machine includes feeding means capable of feeding stock material into and through a cutting zone, first and second arbors disposed in the cutting zone to either side of the feed path of the stock material, each of the arbors being provided with a plurality of saws and shapers aligned with corresponding saws and shapers on the other arbor to saw individual pieces from the stock material and to shape opposed edges. The feed means is driven by a reversible variable speed hydraulic motor and is capable of feeding the stock through the cutting zone at varying speeds. An improved dust collection apparatus is also disclosed herein.

7 Claims, 11 Drawing Figures

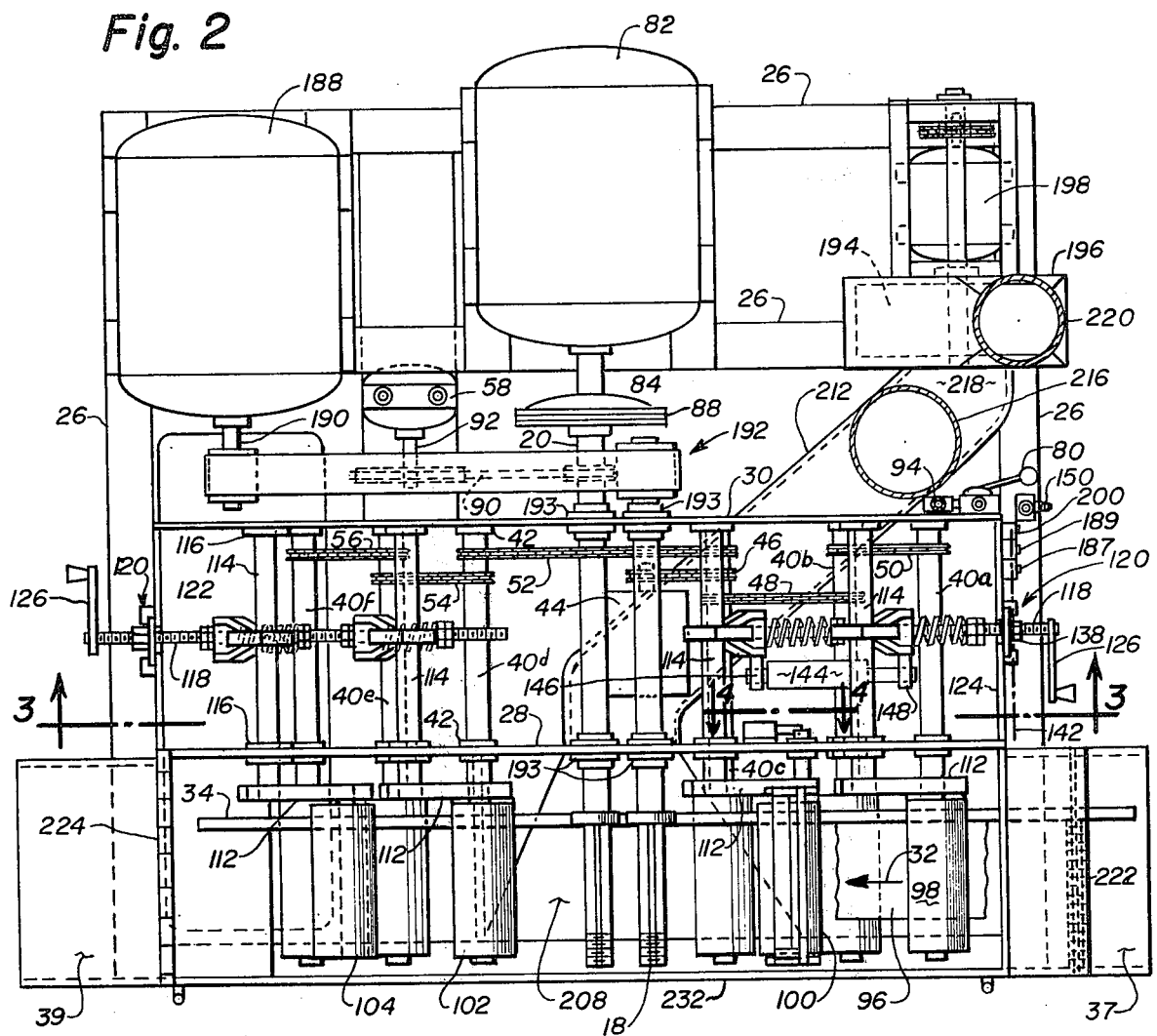
Fig. 2
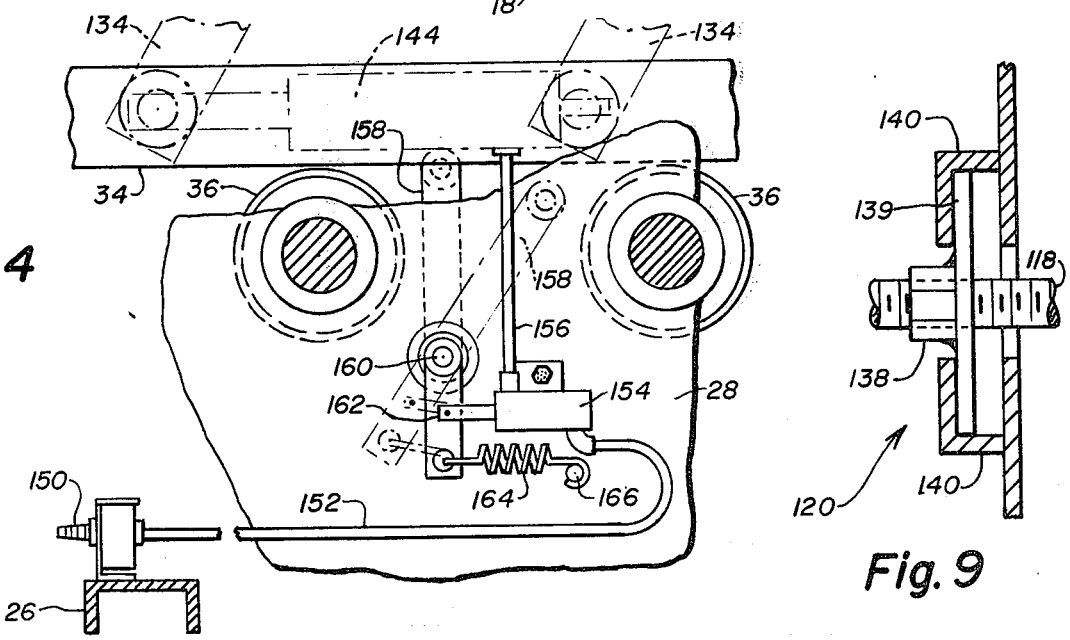
Fig. 4
Fig. 9

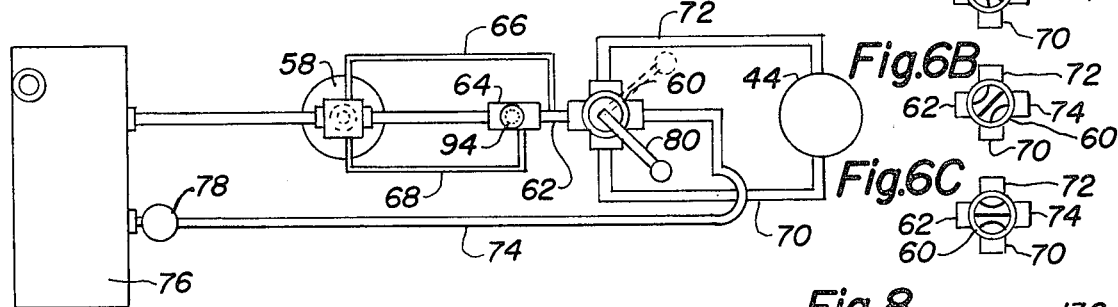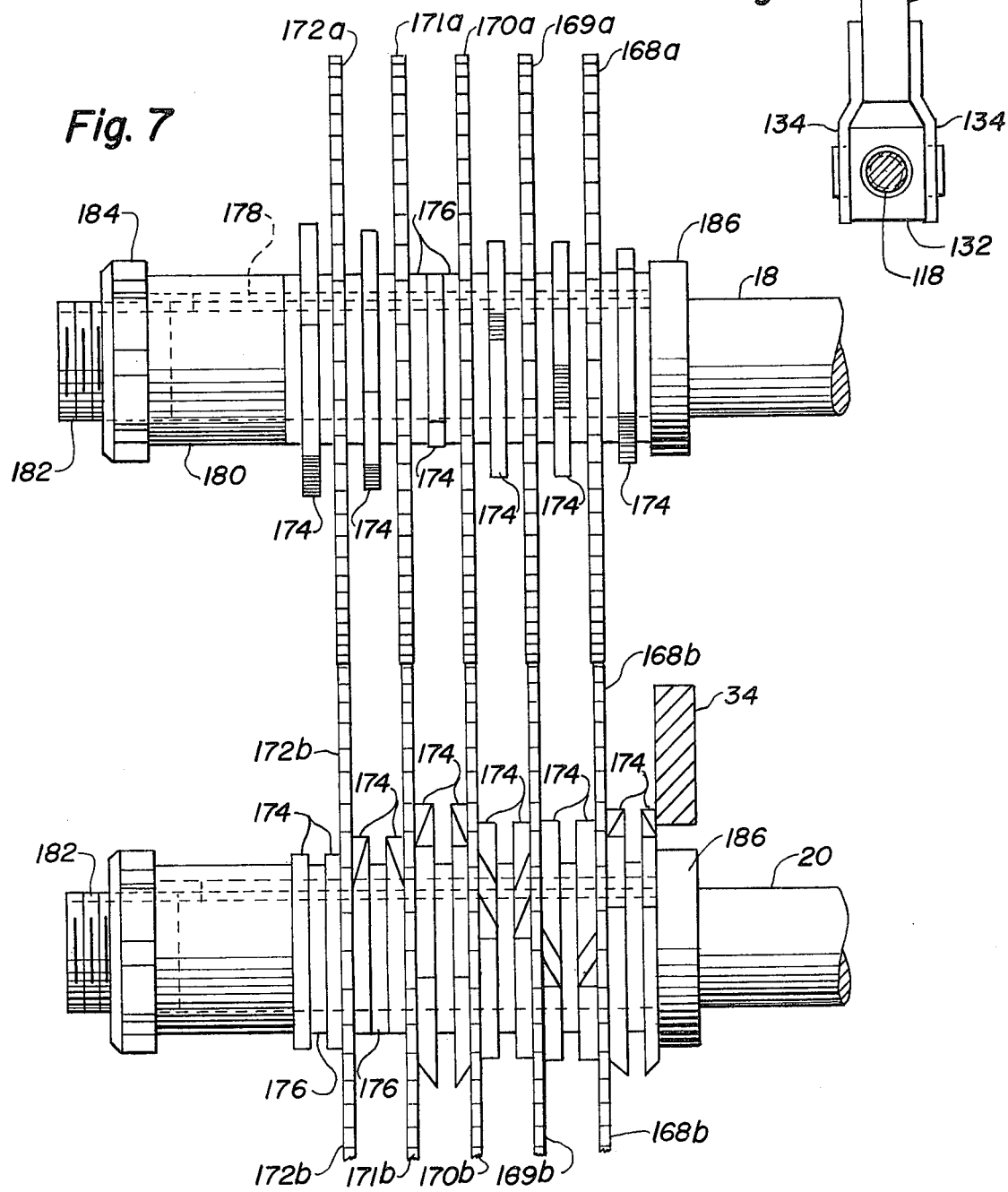

WOODWORKING MACHINE

FIELD OF THE INVENTION

The present invention relates generally to woodworking machinery, and more particularly to a combined machine capable of sawing and shaping stock material into a plurality of pieces which may be of the same or of differing cross-sectional configuration

BACKGROUND OF THE INVENTION

In the past various combined woodworking machines have been proposed for dividing and shaping wood. One such representative patent is U.S. Pat. No. 136,182 issued Feb. 25, 1873 to Rittenhouse. This machine includes two arbors each of which is provided with cooperative shapers, and one of the two arbors being provided with a pair of saws whereby stock material can be divided and shaped into plaster laths. No means are disclosed for supporting the wood and/or feeding the wood and therefore it would be extremely difficult with this form of machine to properly cut the wood. Furthermore, there are obvious disadvantages in utilizing a saw on only a single arbor to cut through the entire width of the stock material. Thus, a single saw will normally make a kerf of twice the width of a pair of cooperating saws. Additionally, a single saw will not cut the wood with the same precision as a pair of cooperating saws mounted on opposed arbors.

Another representative prior art patent is U.S. Pat. No. 987,012 issued Mar. 14, 1911 to Perkins. This patent shows feed rollers for feeding stock material into a cutting zone, upper and lower planers or cutters, and a pair of offset arbors disposed to either side of the cutting zone, each arbor having mounted thereon a single circular saw and shapers to either side of the saw. This permits the machine to divide a plank of wood into two planks having generally the same width, each plank having its edges shaped as to a tongue and groove construction of something similar thereto. Perkins does not disclose the utilization of a plurality of saws mounted on each arbor, nor would it be practical to provide such a construction since downstream of the cutting zone he provides a spreading device to spread the wood after it has been cut and it would not be practical to utilize a plurality of spreaders for a plurality of saws.

Today there are no commercially available machines which are capable of making multiple saw cuts through stock material and simultaneously shaping the edges of the cut material.

OBJECTS OF THE INVENTION

It is a object of the present invention to provide a woodworking machine capable of making a plurality of parallel cuts through stock material and simultaneously shaping the edges of the material as it is being cut.

It is a further object of the present invention to provide improved feeding means for a machine capable of simultaneously making a plurality of cuts through stock material and shaping the edges of the material as it is being cut.

It is an additional object of the present invention to provide an improved dust collection apparatus for a woodworking machine capable of simultaneously cutting through stock material and shaping edge portions of the stock material.

It is a still further object of the present invention to provide a woodworking machine capable of sawing and shaping stock materal which can be operated safely.

These and other objects and advantages of this invention will be apparent to those skilled in the art after a consideration of the following detailed description, taken in conjunction with the accompanying drawings in which a preferred form of this invention is illustrated.

BRIEF DESCRIPTION OF THE VARIOUS FIGURES

FIG. 2 is a section taken along the line 2—2 in FIG. 1.

FIG. 4 is a view taken along the line 4—4 in FIG. 2, a portion of the machine lying behind the line 4—4 being shown in phantom lines.

FIG. 5 is a somewhat schematic view of the hydraulic means for driving the feed rollers.

FIGS. 6A, 6B, and 6C show forward, reverse, and stop positions, respectively, of the hydraulic flow direction control valve.

FIG. 7 is a view looking generally in the direction of feed of the stock material showing two arbors, each of which is provided with a plurality of saws and shapers.

Figure 3:
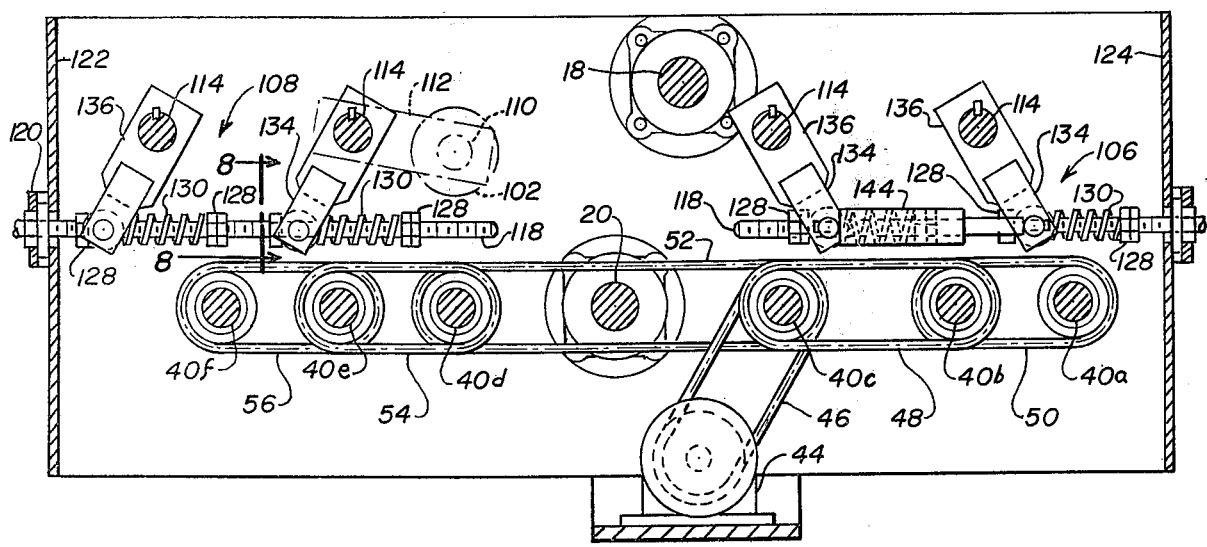
FIG. 3 is an enlarged sectional view of a portion of the machine taken generally along the line 3—3 in FIG. 2.

FIG. 8 is an enlarged sectional view taken along the line 8—8 in FIG. 3 showing a portion of the adjusting mechanism for positioning the tensioning rollers.

FIG. 9 is an enlarged view of a portion of the screw adjusting means.

DETAILED DESCRIPTION OF A PREFERRED EMBODIMENT

Figure 1:
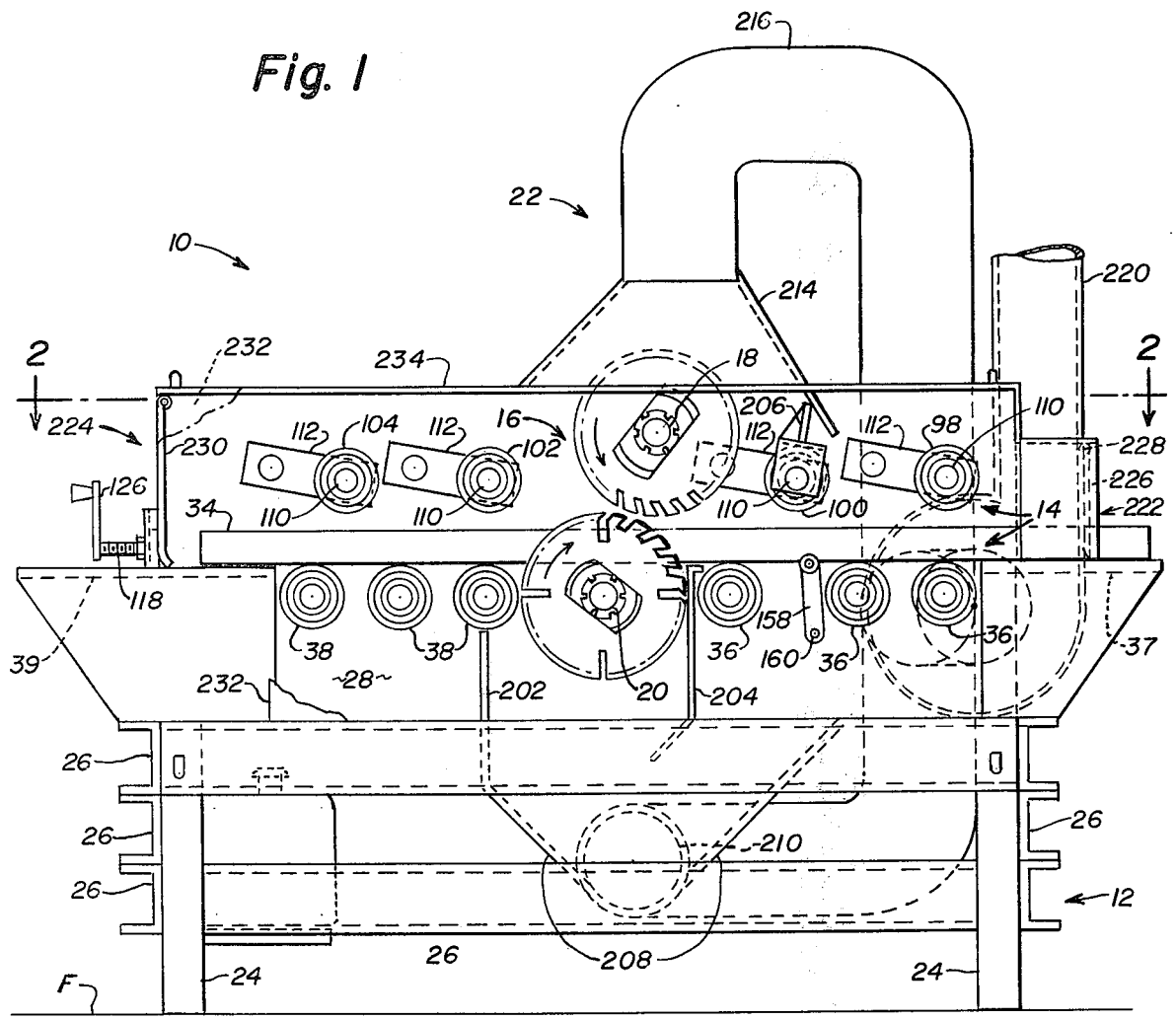
FIG. 1 is a side elevational view of a woodworking machine embodying the principles of this invention.

Referring first to FIG. 1, the machine of this invention, which is indicated generally at 10, includes a frame indicated generally at 12, feed means indicated generally at 14, cutting and shaping means indicated generally at 16, the cutting and shaping means including upper and lower arbors 18, 20, respectively, and a dust collection apparatus indicated generally at 22. The frame 12 includes a machine bed formed of a number of vertical uprights 24 and suitable horizontal frame members 26 which are welded or otherwise rigidly secured to the vertical uprights 24. Extending above the horizontal members 26 are front and rear vertical plates 28, 30, (FIG. 2), respectively, said plates being parallel to the feed path of the stock material which is to be cut, said feed path being indicated by the arrow 32 in FIG. 2.

Supported upon suitable frame members is a fence 34, their being disposed beneath the lower edge of the fence a plurality of feed rollers 36, 38, the feed rollers 36 being disposed on the upstream or feeding side of the cutting and shaping means 16, and the feed rolls 38 being disposed on the downstream or discharge side of the cutting and shaping means 16. Support tables 37, 39 are disposed outwardly of the rollers 36, 38, respectively, the upper surfaces of the tables 37, 39 being in line with the upper surfaces of the rollers 36, 38. Each of the feed rolls 36, 38 is fixedly mounted on one of the rotatable shafts 40a, 40b, 40c, 40d, 40e, and 40f which are journalled for rotation by suitable bearings 42 mounted on plates 28 and 30, the shafts 40 extending through the forward plate 28.

Each of the feed rolls 36, 38 is caused to be rotated by a hydraulic motor 44, the output shaft of which drives shaft 40c through a suitable drive chain 46. An additional chain drive 48 is driven by rotatable shaft 40c, chain drive 48 driving rotatable shaft 40b. Shaft 40a is in turn driven from shaft 40b by chain drive 50. In a like manner shafts 40d, 40e, and 40f are driven by chain drives 52, 54, and 56, respectively.

Referring now to FIG. 5, the hydraulic motor 44 is caused to be driven by a pump 58, the hydraulic fluid under pressure discharged by the pump entering a flow direction control valve 60 by means of a hydraulic line 62. Disposed between the hydraulic line 62 and the pump 58 is a flow rate or volume control valve 64 and suitable bypass lines 66 and 68 whereby the quantity of hydraulic fluid under pressure delivered to the flow control valve may be varied. When the directional valve 60 is in the position shown in FIG. 5 the valve ports will be disposed in the manner shown in FIG. 6A thereby initially sending the hydraulic fluid under pressure through line 70, the motor 44, line 72, and the return line 74, the hydraulic fluid being returned to a reservoir or tank 76 after passing through a filter 78. If the directional valve is changed to the reverse position by swinging the handle 80 from the position shown in full lines in FIG. 5 to the position shown in dotted lines in FIG. 5 the valve will now be disposed in the position shown in FIG. 6B causing the fluid under pressure to initially enter line 72, and then motor 44, line 70, and return line 74 thus causing the motor to operate in the reverse direction. Alternatively, the valve 60 can be disposed in an intermediate position causing the fluid under pressure to be discharged directly from line 62 into return line 74, this position being indicated in FIG. 6C.

An electric motor 82 is suitably mounted on the frame and its output shaft 84 is connected to one end of the arbor shaft 20 by means of a flexile coupling 88. The pump 58 is driven from the arbor shaft 20 by means of a chain 90 which passes over suitable sprockets secured to the arbor shaft 20 and the input shaft 92 of the pump 58.

By varying the position of the control knob 94 on the rate control valve 64 the output speed of the reversible hydraulic motor 44 may be varied. This is an important feature of this invention as it is necessary to vary the feeding speed of the rollers as the cross-sectional area of the stock material may vary considerably, the amount of cutting and shaping being done on any particular stock of a given cross-section may vary, and also since differing stock materials may be of varying hardnesses.

In order to maintain the stock material, indicated at 96 in FIG. 2, in contact with the feed rollers 36, 38, the feeding means includes a plurality of tensioning rollers 98, 100, 102, and 104. The upstream tensioning rollers 98 and 100 are vertically adjustable by a screw adjusting mechanism indicated generally at 106, (FIG. 3), and similarly, the downstream tensioning rollers 102 and 104 are vertically adjustable by a comparable screw adjusting mechanism indicated generally at 108.

Each of the tensioning rollers is journalled for rotation about a shaft 110 which is supported by a rock arm 112, the rock arm 112 being in turn rigidly secured to a rock shaft 114 which is suitably secured for rocking movement about its axis to vertical plates 28 and 30 by bearing structures 116. Each of the screw adjusting mechanisms 106, 108 includes a threaded shaft or rod 118 which is threaded into nut assemblies 120 on left and right side frame members 122, 124, respectively, (FIG. 2), the threaded rods being rotatable by suitable handles 126. Rotatable with the threaded rods 118 are a plurality of pairs of abutments, each abutment being formed by a pair of nuts 128 which are locked together. Disposed between each pair of abutments is a spring 130 and a trunnion 132 which is provided with a transverse aperture through which the treaded rod 118 freely passes. The ends of the trunnions 132 are supported by yoke assemblies, each yoke assembly including spaced apart arms 134 and a rock plate 136 which is secured to the rock shaft 114. The compression spring 130 will normally force the trunnion 132 against the associated abutment 128.

When the handle 126 is rotated the associated threaded rod will be advanced in a generally linear direction parallel to the direction of feed of the stock material 96. Thus, if the right-hand screw shown in FIG. 3 is advanced to the left by proper rotation of the handle 126, the trunnion 132, the yoke 134, the rock plate 136, the rock shaft 114, and the rock arm 112 (FIG. 1) will all rotate in a clockwise direction about the axis of the shaft 114 thereby moving the tensioning rolls downwardly until they are in contact with the stock material. During this movement each of the trunnions will be held against the associated left-hand abutment by the action of the associated compression spring 130. After the tensioning roller has contacted the stock material further turning of the threaded rod will not cause additional rotational movement of the trunnions, but as the right-hand abutment continues to move to the left the compression springs 130 will be compressed causing the rolls 98, 100 to apply a greater force on the stock material. In order to accomodate for the vertical movement of the threaded rod 118 as the arms 136 and yokes 134 are revolved in either a clockwise or counterclockwise direction the nut assembly 120, (FIG. 9), is permitted to rotate slightly. To this end the nut 138 of the nut assembly 120 is welded to a plate 139 which is supported and held from rotation about the axis of the threaded rod 118 by spaced apart flanges 140, the flanges permitting the plate 139 to shift about a transverse axis indicated by the dot-dash line 142 in FIG. 2.

In order to properly position the stock material against the fence 34 and between the first feed roll 36 on rotatable shaft 40a it is necessary to move the upper tensioning roller 96 away from the stock material. This could be done by adjusting the tensioning rollers 98, 100 to the raised position by the screw adjusting mechanism 106 and then adjusting the rollers to their lowered position after the stock material has been placed between the upper tensioning roller 98 and the first feed roller. However, this would require that the operator of the machine adjust the screw mechanism 106 for each piece of stock material which is to be fed into the machine.

In order to eliminate a separate screw adjustment for each piece of stock material of the same vertical height separate means have been provided for raising the first tensioning roller independently of the other rollers until the stock has been properly positioned. This mechanism includes an air cylinder 144 (FIGS. 1 and 4), the anchor end of which is secure to a member 146 which extends outwardly from one of the yoke arms 134 associated with the tensioning roller 100, and the rod end of which is secured to a member 148 which extends outwardly from one of the yoke arms 134 associated with the first tensioning roller 98. The air cylinder is interconnected with the air supply in the shop by means of a fitting 150, which fitting may be disposed at any suitable location on the frame. An air line 152 extends from the fitting to a control valve 154, and a further air line 156 extends from the control valve to the cylinder 144. When air is forced into the cylinder 144 it will be extended to cause the trunnion 132 associated with the first tensioning roller to move away from the associated left-hand abutment thereby raising the tensioning roller 98 independently of the tensioning roller 100 and at the same time compressing the associated spring 130. Alternatively, when the cylinder is open to the atmosphere the associated spring 130 will cause the trunnion to bear against the left-hand abutment to thereby dispose the tensioning roller 98 in the same manner as the other tensioning roller 100.

The air to the cylinder is controlled by a trip arm 158 which operates the valve 154. Thus, when the trip arm 158 is in the vertical position shown in FIG. 4 the valve 154 is open between lines 152 and 156 thereby permitting air under pressure to enter the cylinder 144 and to cause it to be extended, thereby raising the first tensioning roller 98. The trip arm 158 is pivoted about a shaft 160 and can be moved from the full line vertical position shown in FIG. 4 to a dot-dash position also shown in FIG. 4, and when the trip arm is in the dot-dash position it will shift the valve stem of the control valve 154 outwardly of the control valve thereby blocking the air passage between lines 152 and 156 and opening line 156 to atmosphere to permit the air within the cylinder 144 to be discharged by the action of the spring 130. The trip arm is normally maintained in its vertical position by the action of a spring 164 which engages the lower end of the trip arm below the pivot shaft 160, the other end of the spring 164 being secured to a stud 166 or the like suitably secured to the frame 28.

In operation the operator of the machine will independently adjust the tensioning rollers on the upstream and the downstream sides of the cutting and shaping zone so that they will properly bear against the material as the stock is being fed through the machine to insure that the stock is fed into the cutting zone and is properly discharged from the cutting zone. Before any stock material is introduced into the machine the first tensioning roller 98 will be in its raised position and this will permit the operator to properly locate the stock material against the fence 34. After it is properly located it is forced against the trip arm 158 to swing the trip arm from its vertical position towards its lower or dot-dash position to thereby cause the air within the cylinder 144 to be discharged which will then permit the first tensioning roller 98 to be brought into contact with the upper surface of the stock material forcing it against the lower feed rollers supported on shafts 40a and 40b. The feed rollers will now feed the stock material through the cutting and shaping zone and cause the finished stock material to be discharged from the machine.

The cutting and shaping means includes a plurality of pairs of saws 168, 169, 170, 171 and 172, one saw of each pair of saws being secured to the upper arbor 18 and the other saw of each pair of saws being secured to the lower arbor 20. Thus saw 168a is secured to the upper arbor, and saw 168b is secured to the lower arbor in such a manner that the pair of saws 168 lie within the same plane and can cooperatively cut through the stock material. In this regard it should be noted that the arbors 18 and 20 are laterally offset with respect to each other as can best be seen from FIG. 1 so that the peripheries of the saws will extend entirely though the stock material, without interference with each other, as is evident from FIG. 1. Spaced between the saws and to either side of the outermost saws 168 and 172 are a plurality of shapers 174. If tongue and groove stock material is to be discharged from the machine, shapers of the type shown in FIG. 7 may be utilized, the upper arbor shaft 18 is carrying a groove cutting shaper which is suitably spaced away from the associated saws by spacers 176. Similarly, the lower arbor 20 carries shapers 174 which are suitably spaced away fron each other by spacers 176 as best shown in FIG. 7. It should be appreciated that other forms of shapers may be uitlized to work on the upper and lower edges of the stock material in the cutting and shaping zone to form other shapes than tongue and groove. The shapers may extend the full width between pairs of associated saws such as 168, 169 or may include spacers as shown in FIG. 7. Also, it should be appreciated that differing edge treatments can be given to the stock material between differing blades and that some of the stock material may be shaped into tongue and groove edges and that at the same time other portions between differing saws may be shaped to differing configurations. In any event it is necessary to alternate the spacing of the cutting edges of the shapers so that they do not all simultaneously cut at one time. The shapers are secured in place along with the saws by utilization of a key 178, which key will prevent the shapers and the saws with rotating with respect to the arbors 18 and 20. The saws and shapers are also held from lateral movement by a spacer block 180 which is disposed over the outer or threaded end 182 of the arbor 18 or 20 and a nut 184 which bears against the spacer block 180 and forces the entire assembly of saws and shapers against a fixed flange 186 on the arbor shaft 18 or 20, the fixed flange having its surface contacted by the shapers or spacers in substantially parallel alignment with the edge of the fence 34.

The lower arbor 20 is driven by the electric motor 82 the operation of which is controlled by a suitable electric switch 187. The upper arbor is driven from an electric motor 188 which is controlled by an electric switch 189, the output shaft 190 of the electric motor being interconnected with one end of the arbor by suitable sheaves and a drive belt indicated generally at 192. Each of the arbors is suitably supported in cantilever manner by bearings 193 carried by the front and rear plates 28 and 30 and the outer free ends of the arbors are threaded, as shown in FIGS. 2 and 7, to receive the clamping nuts 184, whereby the assemblies of saws, shaper cutters and spacers are readily assembled upon said free ends of said arbors and then are clamped between the fixed collars and threaded nuts.

It is a feature of this invention to provide an improved dust collection system. To this end a blower 194 is provided, the blower being mounted in a blower housing 196. The blower is mounted on the output shaft of an electric motor 198 which is in turn controlled by means of an electric switch 200. Suitable baffles 202, 204, and 206 are disposed about the cutting and shaping zone in such a manner as to prevent the sawdust from being thrown either upstream or downstream away from the cutting zone. Disposed beneath the lower baffles 202 and 204 is a trough 208 which is provided with an annular opening 210 ot one side thereof. A suitable dust collection page 212 is provided, one end of which interconnected with the opening 210. Above the baffle 206 and the saws and shapers is a dust collection hood 214 which is also interconnected with a dust collection pipe 216. The other end of the dust collection pipes 212 and 216 are interconnected with inlet pipe 218 which extends to a suitable opening in the blower housing 196. A discharge pipe 220 is provided, one end of which is interconnected with the periphery of the blower housing, and the material discharged by the blower from the housing exiting through the discharge pipe 220. The other end of the discharge pipe is connected with a suitable dust collection bag or the like (not shown).

In operation the sawdust will be entrapped by the baffles 202, 204 and 206 and either move downardly through the trough 208 to the lower dust collection pipe, or upwardly through the hold 214 to the upper dust collection pipe and thene into the inlet pipe 218 of the blower housing and then through the housing, exiting through the discharge pipe 220. As the blower 194 requires a high volume of air, air will move inwardly from the entrance and discharge sides of this machine and carry away virtually all sawdust.

In order to provide for safe operation of this machine as well as to insure the proper operation of the dust collection system, the sawing zone as well as the feed area is virtually totally enclosed. Thus a gate 222 is provided at the entrance side for the stock material and a discharge gate 224 is also provided. The entrance gate is preferably formed of a plurality of pieces of metal plate 226 which are mounted about a shaft 228 in such a manner that they can only swing between the 6 o'clock position shown in FIG. 1 to a 9 o'clock position and then back again to the 6 o'clock position. The discharge gate 224 may be formed of industrial belting 230 or the like. The sawing and feeding zones are protected by a removable guard plate 232 shown in part in FIG. 1. In addition a hood extension 234 is provided. As the area above and below the sawing and feeding zones are enclosed and also since the plate 28 backs up the sawing and feeding zones it can be seen that this area is entirely protected so that an operator cannot inadvertantly place his hand in these zones during the operaton of the machine.

The operation of this machine should be apparent from the foregoing to those having ordinary skill in the art.

While a preferred structure in which the principles of the present invention has been incorporated is shown and described above, it is to be understood that the invention is not to be limited to the particular details, shown and described above, but that, in fact, widely differing means may be employed in the practice of the broader aspects of the invention.

I claim:

1. A woodworking machine for sawing a stock beam or plank of wood into a plurality of side-by-side board strips and simultaneously shaping the opposite edges of said board strips as they are sawed to form finished strips of desired cross-sectional shapes, said machine comprising in combination;
   a. a frame having a substantially horizontal linear feed path for stock material,
   b. a pair of parallel horizontal arbors supported in cantilever manner by said frame transversely to said path and respectively spaced above and below said path and linearly offset from each other relative to said path and the outer ends thereof being threaded and provided with clamping nuts,
   c. a clamping collar fixedly positioned on each arbor precisely within a common vertical plane,
   d. feeding and tensioning rollers frictionally engaging opposite surfaces of said stock beam or plank to positively feed the same along said path,
   e. a plurality of pairs of similar rotary saws mounted upon said arbors, respectively in common parallel vertical planes and spaced transversely apart predetermined axial distances corresponding respectively to the thicknesses of board strips to be formed by said machine, the summation of the radii of each pair of said saws being at least equal to the vertical distance between the axes of said arbors and the linear offset of said arbors permitting operations of each pair of saws without interference with each other,
   f. pairs of cooperating shaping cutters of less radii than said saws respectively mounted upon said arbors between said saws and operable simultaneously with the rotation of said saws to form desired finished edge contours upon both edges of all of said board strips as sawed by said saws and said clamping nuts on said arbors firmly clamping said saws and shaping cutters in accurate operative relationship with each other, and
   g. power means connected to said arbors and feed means to drive the same in operative directions to feed said stock beam or plank along said path and saw the same into a desired number of board strips while simultaneously shaping and finishing the opposite edges thereof.

2. The woodworking machine according to claim 1 in which the pairs of shaping cutters respectively have different contours to provide different shapes on opposite edges of said board strips, one or more of said shaper cutters in one or more of said pairs being thinner than the space between successive saws, and spacer disc being provided upon said arbors for said shaper cutters to provide a suitable thickness when adjacent said shaper cutters to equal the space between said successive saws.

3. The woodworking machine according to claim 1 further including cooperating key means upon said arbors and said saws and shaping cutters therebetween, and said pairs of shaping cutters respectively having cutting teeth thereon alternated relative to each other so that they do not cut the edges of said board strips simultaneously and thereby minimize force loadings of said cutters.

4. The woodworking machine according to claim 1 further including a fence supported by said frame adjacent one end of said saws and shaper cutters upon said arbors and parallel to said path to guide said stock beam or plank of wood accurately along said path while being sawed and shaped.

5. The woodworking machine according to claim 1 in which said tensioning rollers are all in opposition to said feed rollers engageable with a common surface of said stock beam or plank and include adjustable pressure means operable to force said tensioning rollers against said surface to cause the opposite surface of said stock beam or plank to frictionally engage said feed rollers.

6. The woodworking machine according to claim 5 in which said adjustable pressure means are air cylinder and piston units.

7. The woodworking machine according to claim 1 in which said arbors are each supported in pairs of bearings upon said frame respectively spaced similar substantial distances axially of said arbors to provide accurate maintainance of said saws in common vertical planes in operation.

* * * * *